June 6, 1967
A. M. CALABRESE ET AL
3,324,030
TCC CONTROL BY REACTOR EFFLUENT TEMPERATURE
Filed Nov. 10, 1964
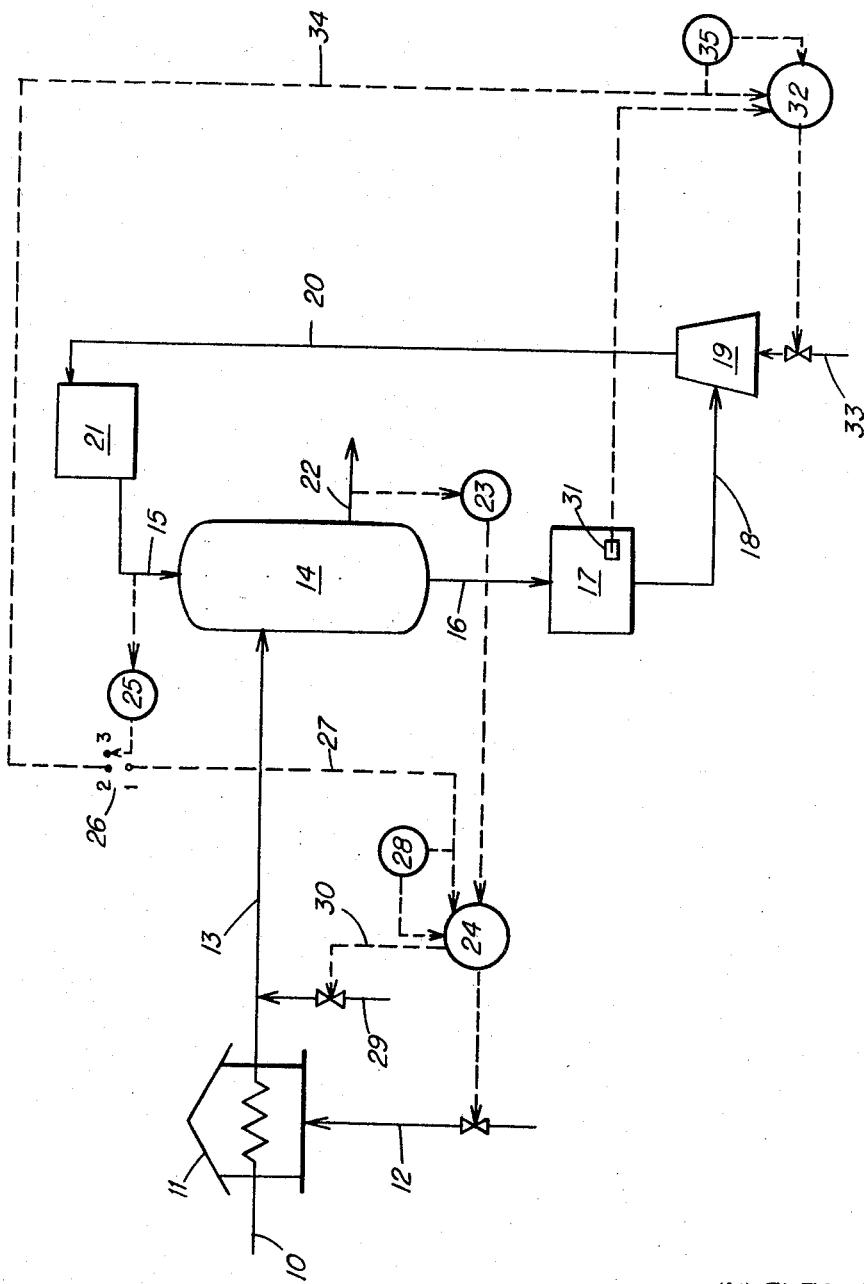
INVENTORS
Thomas Dill
Kevin N. Thompson
Anthony M. Calabrese

United States Patent Office 3,324,030
Patented June 6, 1967

3,324,030
TCC CONTROL BY REACTOR EFFLUENT TEMPERATURE
Anthony M. Calabrese, Greenlawn, N.Y., Thomas Dill, Westport, Conn., and Kevin N. Thompson, Massapequa, N.Y., assignors to Mobil Oil Corporation, a corporation of New York
Filed Nov. 10, 1964, Ser. No. 410,227
7 Claims. (Cl. 208—113)

This invention relates to a method of temperature control in the conversion of petroleum hydrocarbons. More particularly, this invention relates to a process for the automatic control of the reaction temperature in a catalytic cracking process by controlling the heat content of the hydrocarbon feed. Additionally, this invention relates to a method of control in a catalytic hydrocarbon cracking process whereby a substantially constant rate of carbon is deposited on the catalyst. Particular embodiments of this invention comprise controlling said hydrocarbon feed temperature as a function of the product effluent temperature, alone, or in combination with the temperature of the catalyst recycled to the input of the reactor. This invention also relates to apparatus adapted for carrying out such an improved process.

Many processes in the petroleum field, such as cracking, polymerization, reforming, coking and desulfurization, use gravitating columns of granular contact solids at elevated temperatures in an enclosed cyclic system. The granular contact solids may be porous beads of catalysts, granules of coke, sand particles or other suitable materials. For example, in cracking heavy petroleum stocks to produce lighter hydrocarbons, preferably boiling in the gasoline boiling range, the solids are gravitated as a substantially compact bed through a reaction zone where they are contacted with hydrocarbons to effect the cracking reactions, and the converted products are continuously withdrawn from the bed. This process is exemplified by the so-called "moving-bed" or TCC process for hydrocarbon cracking, and this invention will be described with respect to particular application thereto, although it will be appreciated that the invention can be advantageously applied to a variety of processes and is not limited solely to the exemplary TCC process.

The TCC process employs a moving-bed system of granular particles of a catalytic contact material which pass through a reactor in contact with a hydrocarbon feed. Under conversion conditions of elevated temperature, the heavier hydrocarbons are cracked to yield a larger proportion of lighter hydrocarbon materials. The hydrocarbon product stream, referred to as the "effluent," is continuously withdrawn from the TCC reactor and further processed and refined. During this cracking process, a minor proportion of carbonaceous material is formed and is deposited upon the granular particles of catalytic contact material. These carbonaceous deposits, which are low in hydrogen content, are referred to as "coke," and must be periodically removed to maintain the activity of the catalysts. The catalytic materials continuously gravitate from the lower-end portion of the reaction zone to a regeneration zone, or kiln, where they are contacted with a combustion-supporting gas, such as air, which burns the coke from the surface of the catalysts and renders them suitable for reuse. From the lower-end portion of the regeneration zone (kiln), the catalytic materials are transported by a bucket lift system to the reaction zone, or are transported to a lift pipe, wherein they are elevated by a rapidly rising stream of lift gas, generally air, to a position suitable for recycle through the reaction zone.

The desired products of the cracking reaction are gasoline and light fuel oils. Cracking at too high a temperature will result in excessive yields of low-value fixed gases and coke, while cracking at too low a temperature will cause insufficient conversion of the feed to higher value products. Economic efficiency of the process thus depends on cracking at the proper temperature for a given feed and other cracking conditions. The temperature ranges within which conventional cracking reactions are carried out are generally from 850 to 1000° F., and in many cases from about 900 to about 975° F.

The nature of the hydrocarbon feed generally limits the temperature to which it can be heated before being fed to the reaction zone without incurring undesirable premature cracking, and this temperature is generally within the range of from 700 to 830° F. for liquids and from 800 to 900° F. for vapors. The upper temperature limit for the catalyst being fed to the reaction zone is generally fixed at approximately 1075° F. by the design characteristics of the pneumatic lift systems in common use at the present time. Given the reaction zone pressure and volume, the heat capacities of the catalytic solids and hydrocarbon feed, the heat of vaporization characteristics of the hydrocarbon feed, the flow rates of catalytic solids and hydrocarbons in the reaction zone, and the optimum cracking temperature of the feed as determined from its cracking yields, it is feasible to determine the hydrocarbon feed and catalyst inlet temperatures which are the optimum for efficient cracking.

It is important that the reaction zone inlet temperatures of the hydrocarbon feed and catalyst be controlled within close limits for efficient cracking. Of course, most important is control of the cracking temperature within the reaction zone, of which the required uniformity cannot be obtained without frequently applying countervailing control measures to the process, in view of several variables in the process. For instance, the usual relatively frequent variations in the nature of the charge stocks being processed alter the amount of coke deposited on the catalytic solids in the reaction zone and thereby the amount of heat produced and absorbed by the catalytic solids during coke combustion in the regeneration zone. These variations include changes in the vapor-liquid ratio of the feed which affect mix temperature, and changes in size and type of hydrocarbon molecules which yield differing amounts of coke. Alterations of the catalyst to oil ratio required by changes in the nature of the crude oil being processed can affect the catalyst to oil mix temperature in the reactor. Changes in fresh or recycle feed rate can alter the mix temperature and the coke yield by varying the nature of the combined feed and the ratio of granular solids to oil. Variations in the rate or nature of the fluid used in the cooling zone or of the combustion-supporting gas used to regenerate the catalysts can also affect the catalyst temperature and subsequently the mix temperature. These and other variables of lesser importance, such as atmospheric conditions and the degree of catalytic activity, preclude a steady-state operation in which the cracking temperature in the reaction zone remains substantially constant without frequent corrective measures.

Since these variables fluctuate frequently, corrective measures should be applied quite frequently or, if possible, continuously to maintain a desired reaction temperature. To obtain the maximum advantage from such corrective measures, they should also be applied with as little time lag as possible between observation of fluctuations of reactor cracking temperatures and the effects of compensatory process control means. However, it is also advantageous that such observation be made near the point of desired temperature control to minimize the error resulting from the time lag between such observation of the temperature and the desired control point.

In a TCC reactor system, under normal operating conditions, the rate of conversion inside the reactor is controlled by regulating the total heat input into the reactor. Space velocity of reactant and catalyst circulation rate may be manually reset to new levels by the operator from time to time as required by changes in product, catalyst activity, and feed stock. Once the desired level or allowable maximum level is reached, however, these factors are maintained as nearly constant as possible in present TCC operation. Operating control then becomes a matter of the operator keeping the rate of conversion constant. An accepted method of control is to hold the temperature of the oil feed to the reactor constant and to adjust the temperature of the circulated catalyst which reenters the reactor. This adjustment may be accomplished by changing a condition in the kiln, such as the temperature or volume of the combustion air employed to burn off the carbon deposits. Flue gases are continuously removed from the regeneration zone, carrying with them some of the heat produced by the combustion. In some instances additional portions of the heat produced by the combustion are withdrawn from the regenerated catalyst in a cooling zone which may be located outside of and following the regeneration zone or may be located between the upper-end portion and the lower-end portion of the regeneration zone. This cooling zone usually employs conduits to confine a fluid medium for carrying off the heat absorbed from the catalyst through the walls of the conduits.

In control by adjustment of kiln conditions, the adjustment does not become effective in the reactor for approximately forty-five minutes to one hour. This time delay is the time required for the catalyst to respond to the changed condition at the kiln and to move from the burning zone in the kiln and through the lift system to the reactor inlet, which is the point where control becomes effective. The problems created by this time lag become apparent when it is realized that sometimes the corrective action, when finally available at the reactor inlet, is no longer needed. This may result in over-control on the catalyst return temperature adjustment, first in one direction and then in the other. The average yields from alternately over-cracking and under-cracking will differ from the optimum yields which would result if a constant rate of conversion had been possible.

An alternative method of control in air lift units is to vary the temperature of the lift gas, which transports regenerated catalyst back to the reactor. However, the range of adjustment by this method is limited by the practical heat-capacity of the lift gas and the time delay which occurs in adjusting the temperature of the catalyst and transporting it to, and through, the lift separator and storage.

It is accordingly an object of the present invention to provide a hydrocarbon conversion method and system wherein control of a wide range of reactor conditions and system conditions can be made more rapid and precise.

It is a further object of this invention to provide an improved method, and apparatus for carrying out same, for controlling the temperature at which heavy petroleum hydrocarbons are converted to lighter hydrocarbons in a process involving the recycle of granular solids to a hydrocarbon reaction zone.

The foregoing and other objects and advantages of the invention will become apparent from the following description.

It has now been discovered that a TCC unit may be continuously and automatically controlled by varying the heat content of the hydrocarbon feed in accordance with a signal representative of the temperature of the reactor effluent (light petroleum product), or by said signal in combination with a further signal representative of catalyst temperature. A further embodiment of this invention is the method and apparatus for control of a TCC unit by varying the temperature of both the feed and catalyst input to the reactor.

It has further been found that these new control points may be used to make frequent and rapid adjustments to the reaction conditions to maintain a constant rate of coke laydown on the catalyst; since it has been found that a constant reactor effluent temperature indicates a relatively constant rate of coke laydown.

This is accomplished, in accordance with this invention, by utilizing temperature measurements of the reactor effluent at a point adjacent to the reaction vessel for automatic control of the heat content of the hydrocarbon feed to the reaction vessel. The change in heat content of the hydrocarbon feed input is rapidly effected by heating the feed or by otherwise changing the feed vapor-liquid ratio. The heat content of the hydrocarbon feed changes the cracking reaction temperature in a very short time. In another embodiment of this invention, a signal is generated which is representative of the temperature of the catalyst at the inlet to the reactor. This signal is combined with the signal representative of the temperature of the reactor effluent, and the resultant signal controls the heat content of the hydrocarbon feed. A further embodiment provides for control of the hydrocarbon feed by a signal representative of effluent temperature and, in combination therewith, a control to maintain catalyst temperature constant throughout changes in the character of the hydrocarbon feed and coke laydown.

The principal advantage of control by these methods is the very short time lag between adjustment and effect; this may be as short as four minutes, compared with lags up to an hour by prior methods. Elimination of time lag in the control system permits much closer control of reactor temperatures and of coke make. This closer control improves yields from the cracking reaction and permits greater average coke load on the kiln without exceeding temperature limitations, by making coke loading more nearly uniform. Another advantage of the short response time is the feasibility of making reactor control automatic, since design of a control system involving a forty-five-minute time lag is impractical.

An advantage of closer control of reactor conditions arises from the resulting greater uniformity of the temperature of the catalyst, which may thus be held nearer to the allowable maximum at all times. This maximum is set by kiln materials and catalyst limitations. With a higher average catalyst temperature, the heat transferred from the kiln to the reactor will be increased, thus lessening the burden on the oil heater to provide the flexibility needed for control at this point.

Control responsive to the temperature of the reactor effluent yields a more uniform conversion and coke make, even though it is recognized that the same reactor effluent temperature may represent different levels of conversion and coke make with different charge stocks. On units where feedstock characteristics change appreciably, it will be necessary to adjust the control point to compensate for such changes.

The invention in several specific embodiments may be understood more readily by reference to the attached drawing and the following detailed description.

The drawing is a block diagram of a hydrocarbon conversion system embodying certain of the broad features of the invention, where material flows are represented by solid lines and control lines are broken.

A hydrocarbon charge which may contain fresh and recycle stock is fed through a conduit 10 to a feed preheater 11, which may be a conventional furnace for controlling the temperature of the hydrocarbon charge stock. The fuel, used to control the temperature of the feed in preheater 11, enters through a valve-controlled conduit 12. The feed is directed by conduit 13 from the preheater to the TCC reactor 14, which internally contains those features (not shown) well known in the art for inducing uniform flow and proper contact with the catalyst stream which enters via conduit 15.

The contaminated catalyst material is withdrawn from reactor 14 and fed by a conduit 16 into the inlet of a regenerator or kiln 17 for regeneration. The regenerated catalyst material is withdrawn from the kiln and fed through conduit 18 to a lift pot 19 to pass through conduit 20 into a storage tank 21 which, in turn, has its outlet connected to conduit 15 so as to supply a quantity of regenerated catalyst material to the reactor 14.

The product output from reactor 14 is withdrawn through a separate outlet and routed through a conduit 22. In the catalytic oil-cracking system, the output, referred to as reactor effluent, may be routed to a fractionating column to separate the gasoline and other products which make up the effluent.

Sensing means 23 is adapted to sense the reactor effluent temperature; for example, by means of a thermocouple probe located inside conduit 22 at the outlet of the reactor. Means 23 is capable of converting the sensed temperature value into a usable output signal which is operatively connected to the input of control means 24. Controller 24 is connected to furnace 11, via a valve in conduit 12, which regulates the temperature of the hydrocarbon feed to the TCC reactor. Means for manually setting control means 24, and hence also for setting the control of heater 11 and, in turn, effecting control upon the reactor effluent temperature may be included (not shown). The signal from 23 may also be coupled to the input of an indicator apparatus and/or recorder apparatus for continuously monitoring the value of the reactor effluent temperature.

A more specific example of the control operation during an upset in equilibrium may now be considered briefly. Assuming that converter unit 14 is a reactor in a catalytic cracking system and that the sensed magnitude of the reactor effluent temperature suddenly increases, this will result in an increase in the magnitude of the signal which is generated in unit 23 and which is present at the input to control means 24 and its controller unit. Inside the controller unit, the value of the measurement signal now exceeds that of the set-point signal so that an error now exists. At the output of the controller unit and of conrol means 24, there now appears a control signal having a magnitude and sense determined by the magnitude and sense of the error. The control signal is adapted to adjust fuel line 12 to decrease the total heat content of the hydrocarbon charge entering reactor 14, which in turn serves to decrease the magnitude of the actual reactor effluent temperature until it is again restored substantially to its desired set value, at which time the deviation and error are substantially eliminated and the control system is restored to a condition of equilibrium or balance.

The above description is directed to the first embodiment of the invention, wherein variations in product temperature at 22 from a predetermined level are sensed by 23, and a signal representative of such variations is generated by 24 and transmitted to furnace 11 to change the temperature of the hydrocarbon feed to substantially eliminate such temperature variations.

A further embodiment of this invention comprises the generation of a signal representative of catalyst recycle temperature, which is additionally used to control the temperature of the hydrocarbon feedstock. Heretofore in TCC systems, changes in the catalyst return temperature into the reactor occurred upon a change in feedstocks or a feed disturbance, when atmospheric changes affected kiln conditions, and also whenever the operator exercised control by adjusting the heat content of the catalyst returning to the reactor, usually by adjustment of the volume or the temperature of the air fed into the kiln to burn off the coke deposited on the catalyst.

In the above-described method and apparatus, control of the reaction is effected by adjustment of the oil feed heat content via the reactor effluent temperature so that no control adjustments need be made in the kiln or in the catalyst network, and significant kiln conditions are thus held constant. Hence, upon a change in feedstocks or feed disturbance, only a gradual change in the observed value of the catalyst return temperature into the reactor will occur.

The magnitude of the controlled temperature sensed by unit 23 will, after a lapse of time, be effected by a change in the total heat content of the catalyst material entering converter 14 through conduit 15. A method and apparatus will now be described for reducing the response time of the control system when a change occurs in the temperature of the catalyst material entering the converter 14, so that control action is obtained which substantially anticipates the effect which such change would have upon said controlled temperature.

Temperature-sensing means 25 is located suitably with respect to the inlet of converter 14 to sense the temperature of the catalyst material as it enters the reactor. Unit 25 may comprise a thermocouple probe located inside conduit 15 at the entrance to unit 14. Unit 25 may also have a converter portion for converting the sensed temperature value into a usable output quantity or signal such as a pneumatic or electrical voltage signal. The converted output from unit 25 is connected to the input element of a selector unit or switch, shown generally at 26. When the rotary element of unit 26 is in its position No. 3, as shown, unit 25 is not connected operatively to any portion of the control system. When the rotatable element is in position No. 1, then the converted output from unit 25 is operatively connected, as by conduit or electrical wiring 27 to control means 24 and, to a suitable differentiating means 28. The converted output from unit 25 may be operatively coupled to the input of an indicator and/or recorder or to the input of an indicator portion of process control means 24 to provide continuous monitoring of the return temperature of the catalyst material as it enters unit 14 from the storage tank 21. The converted output signal from unit 25 is differentiated by means 28, so that if a relatively rapid rate of change of the catalyst return temperature occurs, then the output of means 28 will have a magnitude which is substantially directly proportional to the rate of change of said return temperature. If the return temperature is not changing, then said magnitude will be zero.

The differentiated output signal from means 28 and the output signal from the basic or initial controller unit in process control means 24 are effectively combined or algebraically added in control means 24, so that a resultant control signal is produced therein having a value or a magnitude which is a function of the algebraic sum of the rate of change of said return temperature plus the difference, if any, between the set value and the actual value of the temperature sensed by unit 23. If desired, the step of differentiating may be accomplished, in effect, within control means 24 in conjunction with the step of effectively combining or algebraically adding the two signals. If desired, suitable conventional signal-amplifying or signal-reducing means may be interposed between the output terminal No. 1 of selector unit 26 and means 28, or between the means 28 and the input to control means 24. Control means 24 may include only one controller unit, or instead, two or more controller units in cascade. The output of the single controller unit, or of the last unit if two or more are employed, is operatively coupled to the actuator means, such as a fuel valve, of furnace 11.

The control effect of the auxiliary network including unit 25 and unit 28 will now be described. When a change in said return temperature of the catalyst material occurs, it will alter the heat balance for the converter unit 14, and after a short period of time it will also cause the temperature sensed by unit 23 to be altered. Closer and more rapid over-all control can be achieved for the system if this ultimate effect upon the temperature, caused by the varying heat content of the catalyst, can be anticipated and compensated for fully in advance without having to wait for its effect upon reaction temperature, which would be sensed by the normal action of the main control loop which starts with unit 23. The auxiliary network including units 25 and 28 is provided for this purpose. The signal from means 28 quickly anticipates both the direction and the magnitude of the change which normally would eventually result from a sudden or relatively rapid change in the magnitude of the return temperature of the catalyst material. During the early period after a change, the instantaneous magnitude of the signal from means 28 may be comparable or of the same order as that of the output signal from said basic controller unit. If said return temperature should start to rise, the magnitude of the differentiated signal from means 28 will effectively supplement the magnitude of the output signal from said basic control unit and will result in a variation in the magnitude of the output signal from control means 24 which is coupled to the input of the adjustable furnace means 11, whereby furnace 11 will be automatically adjusted to decrease the total heat content of the hydrocarbons entering unit 14 from conduit 13 in order to produce the required compensation; if said return temperature should suddenly fall, the differentiated signal from means 28 will effectively increase the total heat content of the hydrocarbons entering unit 14 from conduit 13. After the rise or fall in said return temperature has ended and it is again constant, the temperature sensed by unit 23 will continue at its previously set value.

Various arrangements may be provided in either of the two embodiments described above for heating to a predetermined extent the hydrocarbons (feedstock) which flow in conduit 13 prior to entering the converter or reactor 14, and various means may be provided for automatically adjusting the total heat content of the hydrocarbons entering unit 14 in response to the control signal from control means 24. In a TCC system, for example, unit 11 may comprise a conventional heater with a fuel feed line 12 (as illustrated) for adjustably heating the hydrocarbons which enter the reactor. The control signal from means 24 may be operatively connected or coupled to actuate a control valve in line 12 for controlling the flow of fuel gas, or fuel oil, to the burners of the heater so as to adjust automatically the transfer line (outlet) temperature of the heater in response to changes in the magnitude of the output signal from control means 24. Alternatively, if a feed preparation fractionator is employed to supply the reactor with a mixed feed of both liquid and vapor hydrocarbons, then the control signal from means 24 may be operatively connected so as to adjust automatically the transfer line temperature of the fractionator.

An alternative or additional means which is particularly effective within a short response period comprises controlling the heat content of the hydrocarbon feeds. It will readily be apparent that maintenance of a constant temperature in a fluid feed may still result in major variations in effluent temperature due to variations in the vapor-liquid ratio of the feed. For example, an increase in the vapor-liquid ratio increases the effluent temperature, and, of course, the reaction temperature, in relation to the heat of vaporization of the feedstock. Conversely, a decrease in the vapor-liquid ratio of the feed results in a lower effluent temperature in relation to the heat required to vaporize the increased amount of liquid. These variations in vapor-liquid ratio arise from variations in the boiling-point characteristics of the feed stocks. A heavier feedstock, which has a higher boiling-point curve, will produce feed in conduit 13 with a lower vapor-liquid ratio than a lower boiling feed at the same temperature.

A means to control the vapor-liquid ratio in the feed conduits is to recycle a quench liquid, such as a naphtha cut, from the fractionating tower which receives effluent from 22. The naphtha from the fractionating tower is cooled in a heat exchanger and pumped into conduit 13 through conduit 29. The rate of naphtha recycle through the reactor is controlled by a signal from controller 24 through line 30. The heat absorbed in raising the temperature of the naphtha and vaporizing it readily alters the reaction temperature in 14.

Another control mechanism may comprise means in 11 for automatically adjusting the extent of diversion of a portion of the unit recycle from the vaporizing feed system to the liquid feed, wherein the total recycle and total feed could be held constant, but the total heat input of the hydrocarbons to the reactor would be changed by the amount of the heat of vaporization of the difference in liquid feed volume. A portion of the oil feed would be made to bypass the heater to an extent depending upon the magnitude of the control signal from means 24, whereby there would result an automatic adjustment of the total heat content of the hydrocarbons entering the reactor. Other adjustable control mechanisms may be employed for means 11, such as means for automatically varying either the recycle volume or else the liquid feed rate, each in response to variations in the magnitude of the output signal from control means 24.

The individual components of the novel combination of this invention are each conventional and may be chosen to result in a pneumatic system, an electrical system, or a combined pneumatic-electrical system. For example, 23 and 25 may be thermocouple converters, such as Type 700T–C5–139, manufactured by Taylor Instrument Company. Item 28 may be a ratio relay, Type 57PBR, manufactured by The Foxboro Company. Item 24 could be a temperature recorder controller, Type 92J–F–941, manufactured by Taylor Instrument Company, in combination with an impulse relay, Type 68V12, Moore Products Company, to totalize the signals from 23 and 25. The use of other components will be readily apparent to those skilled in the art.

In either of the previous embodiments, comprising a main control loop with means 23 and 24 above or in combination with the auxiliary control loop with means 25 and 28, variations in the temperature of the recycled catalyst will produce disturbances in the system which will necessitate continuous control activity.

A further embodiment of this invention comprises the aforementioned use of these new control points to make frequent and repeated adjustments in the reactor conditions to maintain a constant rate of coke laydown on the catalyst. This method of control is based upon the correlation between a constant effluent temperature with a constant rate of coke laydown. When this is accomplished, all kiln conditions are held constant at the highest level of kiln capacity and efficiency, and the temperature of the catalyst returning to the reactor will not appreciably change unless there is a significant change in the feed stocks. Fuel cost reduction thus arises from the ability to maintain catalyst temperature at or very near the allowable maximum. With constant kiln conditions, the entire catalyst system will serve as a device for measuring coke laydown. At present, changes in the temperature of the catalyst to the reactor are due to the combined effects of changes in coke burned and changes in combustible air volume and heat content, and the effects cannot be evaluated separately. By the method of maintaining constant kiln conditions this temperature will change only when coke laydown changes. A reactor effluent control temperature will be selected and held at a point by means of controller 24 which will supply the kiln with a coke load to match catalyst circulation and the desired catalyst inlet temperature at 15. If a change in feed stock occurs, such that the control effluent temperature no longer produces the same coke on the catalyst, then the slow change in catalyst exit temperature from 17 will serve as a guide for resetting of the reactor effluent control point, so that catalyst temperature will return to the original value with no adjustment to the kiln or lift system. Minor changes in catalyst temperature will be compensated for by means in the catalyst lift system described below.

It is in accordance with another aspect of this invention that control means will now be described for automatically adjusting the total heat content of the catalyst at some point in the catalyst return path to prevent, or at least to minimize, a change in the return temperature of the catalyst entering the reactor which would be caused by a change in the catalyst temperature inside the kiln. Such adjustment can thus serve to hasten the over-all control action. For example, the adjustment effectively bypasses the action of the control means which otherwise eventually would automatically adjust the total heat content of the hydrocarbon charge entering the reactor.

The system will first be considered with the rotatable element of selector unit 26 in position No. 3, which serves to disconnect sensing unit 25 from all control networks. A temperature-sensing device 31 is provided inside regenerator 17 to sense the temperature of the catalyst material.

The output of unit 31 is connected to the input of process control means 32. Control means 32 may include an indicator portion and a recorder portion to monitor the temperature sensed by unit 31.

Process control means 32 may include a single controller unit, or instead it may include two or more controller units connected in cascade. Such controller unit or units may, for example, be essentially pneumatic or electronic units. Manually operated means may set the basic or initial controller unit at a set point corresponding to a particular value of the temperature sensed by unit 31. The magnitude of the control signal at the output of means 32 is a function of the difference between said set value and the value of the temperature sensed by unit 31. This control signal is coupled to the input of means 33 for adjusting the total heat content of the catalyst material at some location in its path prior to its entry into converter 14. The output of heat-adjusting means 33 may be operatively connected through lift pot 19 to transport means 20 for carrying the catalyst material to the storage tank 21.

Means 33 may include a heater for adjusting the temperature of the lift gas, and thus adjusting the temperature and total heat content of the catalyst in the lift system 20 to an extent depending upon the magnitude of the control signal from means 32.

Assume now that the temperature of the catalyst sensed by unit 31 inside the regenerator should start to increase, due to a feedstock disturbance in line 10, for example, which has increased the rate of coke laydown. The signal from unit 31 will upset the equilibrium of control means 32. Hence the control signal generated in the output of control means 32 will change in magnitude as a function of the error now existing in control means 32, and such change will adjust the heater in means 33 to decrease the temperature of the lift gas which enters lift pot 19 and which raises the catalyst in the lift system 20. Such variations in the lift gas temperature will maintain the temperature and total heat content of the catalyst substantially constant as it enters the reactor at 15.

An arrangement for closer and more rapid control action will now be described. With the rotatable element of selector unit 26 in its position No. 2, the converted output from the catalyst return temperature-sensing unit 25 is coupled through line 34 to control means 32 and to the input of suitable differentiating means 35. Differentiating means 35, which may be similar to means 28, has its output coupled to an input of control means 32 to furnish such input with a signal having a magnitude which is substantially directly proportional to the rate of change of the catalyst return temperature sensed by unit 25. The differentiated output signal from means 35 and the output signal from the basic or initial controller unit in control means 32 are effectively combined or algebraically added in control means 32 so that a resultant control signal, for example, pneumatic or electrical, is generated. Through connection 34, the output from unit 25 may be coupled to an indicator and/or recorder in means 32.

The operation of the combination of the network including units 31, 32 and 33 with the network including units 25, 35, 32 and 33 will now be briefly described. Assume that the temperature of the catalyst sensed by unit 31 inside kiln 17 should start to increase due to a feed disturbance in line 10, for example, which has increased the rate of coke laydown. As previously described, the adjustable means 33 would receive from the output of control means 32, in response to the increase in the magnitude of the converted signal from unit 31, a signal to automatically adjust the heater in means 33 to decrease the temperature of the lift gas leaving lift pot 19, thereby tending to offset the increase in catalyst temperature moving up the lift system 20.

The presence of the auxiliary branch, including unit 25 and differentiating means 35, results in an additional control effect. When the catalyst return temperature at 15 starts to increase due to the increase in the catalyst temperature sensed by unit 31, then there is a corresponding increase in the magnitude of the converted signal from unit 25. The rate-of-change signal now appearing in the output of differentiating means 35 quickly anticipates both the direction and substantially the magnitude of the change in catalyst temperature which would ultimately result from such feed disturbance, and such signal is utilized in control means 32 to hasten the desired control action and correction previously described. This change sensed by 25 may be due to fluctuations arising in the lift system between conduits 18 and 15.

It will be appreciated that selector switch 26 may be in position No. 1, to operate concurrently with the catalyst temperature control loop. Alternatively, control means 25 may concurrently be connected with means 24 and 32. The operation of these embodiments will be evident from a consideration of the foregoing descriptive material.

Suitable systems for the control of the catalyst temperature are more fully described in Patent 3,238,121, by Peter S. Parkin and Patent 3,238,122, by William A. Hagerbaumer.

Though this invention has been illustrated in a specific embodiment with reference to a TCC unit, it is clearly applicable to other conversion processes, such as the fluid catalytic cracking (FCC) process. For example, a temperature sensing device in the effluent stream from an FCC reactor may be used to control the heat content of the hydrocarbon feed to the reactor. Similarly the other control systems defined above are applicable to the FCC process and apparatus. Temperature sensing devices in the catalytic regenerator or in the catalyst feed line adjacent to the reactor may be used to trim the temperature control system. In a specific embodiment, the control system in the drawing may be applied to an FCC unit. Means 23 would be positioned at the outlet of the reactor, either before or after the conventional cyclone separation. Means 25 would normally be positioned at the bottom of the reactor in the catalyst inlet prior to formation of the mixed oil-catalyst stream. Means 31 would be at the exit of the catalyst regenerator and could be used to control the air or water input in a conventional recycle catalyst cooler. Minor modifications necessary to complete the details for the adoption of the control process and apparatus of this invention to an FCC unit readily follow from the above-descriptive material.

From the foregoing, it can be seen that a novel method and apparatus, therefore, has been provided for automatically controlling the catalytic cracking of hydrocarbons. By this invention, the control of reactor conditions is made more precise with a resultant improvement in the product.

Although the present invention has been described with preferred embodiments, it should be understood that the control principles of the present invention are applicable to many other processes involving positive feedback of heat or material in which adverse time delays may be present, and that any of many suitable types of control means, e.g. electrical means or pneumatic means, can be used in the apparatus of this invention. Accordingly, it should be understood that resort to modifications and variations may be had without departing from the spirit and scope of this invention, as those skilled in the art will readily understand. Such variations and modifications are, therefore, considered to be within the purview and scope of the appended claims.

We claim:

1. In a continuous process for the conversion of a hydrocarbon feed wherein said hydrocarbon feed is contacted in a reaction zone under conversion conditions including an elevated temperature with a mass of granular solids, conversion product and spent granular solids are continuously withdrawn from the reaction zone, the spent granular solids are continuously passed from the reaction zone to a regeneration zone wherein carbonaceous deposits from the conversion reaction are removed from the granular solids, the regenerated granular solids are continuously withdrawn from the regeneration zone and transported through a transport zone to the reaction zone, the improvement for controlling the temperature of the conversion reaction which comprises generating a first signal representative of variations of the temperature of said withdrawn conversion product from a predetermined desired temperature, generating a second signal representative of variations in the temperature of said regenerated granular solids and automatically and continuously applying said first and second signals to control the heat content of said hydrocarbon feed to substantially maintain withdrawn conversion product at said predetermined temperature.

2. In the process of claim 1, the improvement which comprises generating a third signal representative of variations of the temperature of said regenerated granular solids from a predetermined temperature and applying said third signal to automatically and continuously control the temperature of said granular solids substantially at said predetermined temperature.

3. In an apparatus which comprises a reactor adapted for contacting a hydrocarbon under conversion conditions with a mass of granular solids, means for feeding a hydrocarbon charge into said reactor, means for discharge of conversion product from said reactor, a regenerator adapted to combustibly remove carbonaceous deposits from said granular solids, means for passage of said granular solids from said reactor to said regenerator, and means to transport said granular solids from said regenerator to said reactor, the improvement for controlling the temperature of the conversion reaction which comprises means to generate a signal representative of variations of the temperature of said withdrawn conversion product from a predetermined temperature, and means to automatically and continuously apply said signal to control the heat content of said hydrocarbon feed to substantially maintain withdrawn conversion product at said predetermined temperature.

4. In a continuous process for the catalytic conversion of a hydrocarbon feed wherein said hydrocarbon feed is contacted in a reaction zone under conversion conditions with a mass of granular solids, conversion products and spent granular solids are continuously withdrawn from the reaction zone, the spent granular solids are continuously passed from the reaction zone to the regeneration zone wherein carbonaceous deposits from the conversion reaction are removed from the granular solids, the regenerated granular solids are continuously withdrawn from the regeneration zone and upwardly transported to the reaction zone, the improvement for controlling the conversion reaction which comprises maintaining a substantially constant formation rate of carbonaceous deposits which comprises generating a signal representative of the variation of the temperature of said withdrawn conversion product from a preselected desired temperature determined by its relation to the formation rate of carbonaceous deposits and automatically and continuously varying the heat content of said hydrocarbon feed responsive to said signal to reduce variations of the temperature of said withdrawn conversion product.

5. In a continuous process for the conversion of a hydrocarbon feed wherein said hydrocarbon feed is contacted in a reaction zone under conversion conditions including an elevated temperature with a mass of granular solids, conversion product and spent granular solids are continuously withdrawn from the reaction zone, the spent granular solids are continuously passed from the reaction zone to a regeneration zone wherein carbonaceous deposits from the conversion reaction are removed from the granular solids, the regenerated granular solids are continuously withdrawn from the regeneration zone and transported through a transport zone to the reaction zone, the improvement for controlling the temperature of the conversion reaction which comprises generating a first signal representative of variations of the temperature of said withdrawn conversion product from a predetermined desired temperature, automatically and continuously applying said signal to control the heat content of said hydrocarbon feed, generating a second signal representative of variations of the temperature of said regenerated granular solids from a predetermined temperature and applying said second signal to automatically and continuously control the temperature of said granular solids.

6. In an apparatus which comprises a reactor adapted for contacting a hydrocarbon under conversion conditions with a mass of granular solids, means for feeding a hydrocarbon charge into said reactor, means for discharge of conversion product from said reactor, a regenerator adapted to combustibly remove carbonaceous deposits from said granular solids, means for passage of said granular solids from said reactor to said regenerator, and means to transport said granular solids from said regenerator to said reactor, the improvement for controlling the temperature of the conversion reaction which comprises means to generate a first signal representative of variations of the temperature of said withdrawn conversion product from a predetermined temperature, means to generate a second signal representative of variations in the temperature of said regenerated granular solids and means to automatically and continuously apply said first and second signals to control the heat content of said hydrocarbon feed to substantially maintain withdrawn conversion product at said predetermined temperature.

7. In an apparatus which comprises a reactor adapted for contacting a hydrocarbon under conversion conditions with a mass of granular solids, means for feeding a hydrocarbon charge into said reactor, means for discharge of conversion product from said reactor, a regenerator adapted to combustibly remove carbonaceous deposits from said granular solids, means for passage of said granular solids from said reactor to said regenerator, and means to transport said granular solids from said regenerator to said reactor, the improvement for controlling the temperature of the conversion reaction which comprises means to generate a first signal representative of variations of the temperature of said withdrawn conversion product from a predetermined temperature, means to automatically and continuously apply said first signal to control the heat content of said hydrocarbon feed, means to generate a second signal representative of variations of the temperature of said regenerated granular solids from a predetermined temperature and means to apply said second signal to automatically and continuously control the temperature of said granular solids.

References Cited

UNITED STATES PATENTS

| | | | |
|---|---|---|---|
| 2,791,545 | 5/1957 | Kilpatrick | 208—165 |
| 2,931,767 | 4/1960 | Wilson | 208—166 |
| 3,000,812 | 9/1961 | Boyd | 208—138 |
| 3,238,122 | 3/1966 | Hagerbaumer | 208—165 |

DELBERT E. GANTZ, *Primary Examiner.*

A. RIMENS, *Assistant Examiner.*